United States Patent
Lengenfelder

(10) Patent No.: US 11,424,712 B2
(45) Date of Patent: Aug. 23, 2022

(54) SAFE STATE OF AN ELECTRIC MACHINE

(71) Applicant: ZF Friedrichshafen AG, Friedrichshafen (DE)

(72) Inventor: Michael Lengenfelder, Auerbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 62 days.

(21) Appl. No.: 16/755,514

(22) PCT Filed: Sep. 5, 2018

(86) PCT No.: PCT/EP2018/073862
§ 371 (c)(1),
(2) Date: Apr. 10, 2020

(87) PCT Pub. No.: WO2019/072460
PCT Pub. Date: Apr. 18, 2019

(65) Prior Publication Data
US 2021/0226571 A1 Jul. 22, 2021

(30) Foreign Application Priority Data
Oct. 12, 2017 (DE) ...................... 10 2017 218 189.3

(51) Int. Cl.
H02P 29/024 (2016.01)
(52) U.S. Cl.
CPC .................. *H02P 29/0241* (2016.02)
(58) Field of Classification Search
CPC ..................................................... H02P 29/024
(Continued)

(56) References Cited

U.S. PATENT DOCUMENTS 6,683,435 B1    1/2004  Liang et al.
6,710,564 B2 *  3/2004  Shibuya ................... H02P 6/18
                                                          318/400.13

(Continued)

FOREIGN PATENT DOCUMENTS

DE          19835576 A1    11/1999
DE        102005009341      5/2006
(Continued)

OTHER PUBLICATIONS

Search Report issued in German Patent Application No. DE 10 2017 218 189.3 dated Jan. 11, 2018 (10 pages).
(Continued)

Primary Examiner — Jorge L Carrasquillo
(74) Attorney, Agent, or Firm — Crowell & Moring LLP

(57) ABSTRACT

The invention relates to an inverter for controlling an electric machine on a voltage source having a first and a second potential. The inverter comprises a plurality of bridge circuits which each comprise a first flow control valve, a second flow control valve and a connector for the electric machine, and a first interface for receiving individual control signals for the flow control valves and a second interface for detecting a switch-off signal. Each first flow control valve is configured to control current between the high electrical potential and the associated connector, and each second flow control valve is configured to control current between the associated connector and the low electrical potential. A switch-off device is configured to close either all first or all second flow control valves as a function of the shut-off signal and independently of signals on the first interface.

16 Claims, 2 Drawing Sheets

(58) Field of Classification Search
USPC .......................................................... 318/434
See application file for complete search history.

(56) References Cited

U.S. PATENT DOCUMENTS

| | | |
|---|---|---|
| 2006/0091840 A1 | 5/2006 | Weinmann |
| 2011/0310644 A1* | 12/2011 | Ogura ................. H02M 7/5387 363/55 |
| 2013/0314014 A1* | 11/2013 | Tremel .................... H02M 1/32 318/400.22 |
| 2015/0280624 A1* | 10/2015 | Sotome ............... H02M 7/5387 318/400.22 |
| 2016/0056750 A1 | 2/2016 | West et al. |
| 2017/0327990 A1* | 11/2017 | Lee ........................ D06F 37/42 |

FOREIGN PATENT DOCUMENTS

| | | |
|---|---|---|
| DE | 102010062334 | 6/2012 |
| DE | 102015203960 A1 | 10/2015 |
| DE | 102017218189 A1 | 4/2019 |
| JP | H08186984 A | 7/1996 |
| JP | 2016123141 A * | 7/2016 |
| JP | 6131940 B * | 5/2017 |
| JP | 2017169346 A * | 9/2017 |
| WO | WO 2019072460 A1 | 4/2019 |

OTHER PUBLICATIONS

International Search Report in PCT/EP2018/073862 dated Nov. 27, 2018 (2 pages German, 2 pages English).
Written Opinion in PCT/EP2018/073862 dated Nov. 27, 2018 (6 pages).
International Preliminary Examination Report in PCT/EP2018/073862 dated Jan. 24, 2020, including annexes (21 pages).

* cited by examiner

SAFE STATE OF AN ELECTRIC MACHINE

CROSS-REFERENCE TO RELATED APPLICATIONS

This application is a U.S. national stage application under 35 U.S.C. § 371 of PCT Application No. PCT/EP2018/073862, filed on Sep. 5, 2018 and published as WO 2019/072460 on Apr. 18, 2019, which claims priority from German Application No. 10 2017 218 189.3, filed on Oct. 12, 2017, the entirety of which are each hereby fully incorporated by reference herein.

The present invention relates to the control of an electric machine. In particular, the invention relates to bringing the electric machine into a safe state.

An electric machine, for example an electric motor, can be controlled in terms of its movement behavior by means of an inverter. To that end, the inverter usually comprises a plurality of bridge circuits each comprising two current valves, which can be driven alternately in order to provide a predetermined potential at an assigned terminal of the machine.

In order to switch off the electric machine, the current valves can be driven in such a way that the electrical terminals of the machine are connected to a common potential and the machine is actively short-circuited. A kinetic energy of the machine can then be converted into electrical energy and the latter can be converted into heat by way of the short circuit, with the result that the machine can be braked rapidly and without external braking work.

The active switching-off may not be available if a control device that controls the current valves has a defect or is not connected to the current valves. It has been proposed to connect control terminals of the current valves to a fixed potential as necessary via appropriate pull-up or pull-down resistors in order to be able to bring about an active short circuit even in the event of the device having a defect. However, determining which of the current valves close if the need arises is usually not carried out depending on a fault that is present, with the result that an attempt at switching off the machine can bring about a short circuit in a link circuit from which the current valves are fed.

DE 10 2005 009 341 A1 relates to a driver circuit for driving an electric motor at a voltage link circuit. If a voltage at the link circuit is too high, then the driver circuit generates a short circuit of terminals of the electric motor.

DE 10 2010 062 334 A1 relates to a bridge circuit for controlling a load between a high and a low electrical potential. It is proposed, for the purpose of safeguarding the load, to generate alternately a short circuit connected to the high potential and a short circuit connected to the low potential.

A problem addressed by the invention is to specify an improved technique for switching off an electric machine controlled in this way. The invention solves the problem by means of the subjects of the independent claims. Dependent claims present preferred embodiments.

An inverter is configured for controlling an electric machine at a voltage source with a first and a second potential. In this case, the inverter comprises a plurality of bridge circuits each comprising a first current valve, a second current valve and a terminal for the electric machine, and a first interface for receiving individual control signals for the current valves, and a second interface for detecting a switch-off signal. Each first current valve is configured to control current between the high electrical potential and the assigned terminal, and each second current valve is configured to control current between the assigned terminal and the low electrical potential. A switch-off device is configured to close either all first current valves or all second current valves depending on the switch-off signal and independently of signals at the first interface.

The switch-off device can close either all first current valves or all second current valves dynamically, for example depending on the type of switch-off signal, in order to bring the electric machine into a safe state. The safe state usually comprises shutdown, current not flowing through the machine. By means of the switch-off device, the safe state can be controlled even if a control device that is connectable to the first interface, in particular, is not operating without faults or is not present. In one embodiment, two different switch-off signals can be differentiated, one resulting in the closing of all first current valves and another resulting in the closing of all second current valves. The switch-off signals can be chosen such that they cannot be present simultaneously. By way of example, a first signal can request switching off and a second, binary signal can choose between the first and second current valves.

The electric machine can comprise a servo or traction motor, for example, and be configured in particular for use on board a motor vehicle. The inverter can be constructed in a manner integrated with the switch-off device, such that redundant control paths can always be available for the electric machine. The switch-off device can comprise an electronic circuit and be constructed in a manner integrated with other electronic elements of the inverter. In one embodiment, the switch-off device can also be embodied in a manner integrated with current valves which can comprise, for example, field effect transistors (FET), in particular metal oxide FETs, or thyristors or else other semiconductors.

The switch-off device can be embodied as an SiP ("System-in-Package"), for example. In this case, passive and active components and also further components can be produced on a plurality of semiconductor chips by means of microsystems technologies and said chips can be combined in a package (referred to as IC package) by means of appropriate construction or connection technology. Alternatively, the switch-off device can also be integrated as an MCM ("Multi Chip Module") composed of a plurality of semiconductor chips in a common package. In a further embodiment, the switch-off device can also be embodied as an application-specific integrated circuit ("ASIC").

The switch-off device can be configured to determine a defective current valve and to close the first current valves or the second current valves depending on a result of the determination. This therefore means that it is not necessary to determine externally which of the current valves must be closed for controlling the safe state. That is particularly relevant if an external functional component that is intended to determine a fault is itself subject to a malfunction. The switch-off signal can be provided in a user-control manner, for example, and the determination of how the adoption of the safe state is intended to be controlled can be carried out autonomously by the inverter.

In a first variant, the switch-off device is configured, in the case of a current valve that is not to be opened, to close all current valves which correspond to said current valve. By way of example, if a first current valve is permanently closed, then the active short circuit can still be controlled by closing all other first current valves. If the second current valves were closed instead, then although the active short circuit could be produced, at the same time there would be a short circuit by way of the potentials from which the electric machine can be fed during normal operation or into which the electric machine can feed during generator operation.

In a second variant, the switch-off device is configured, in the case of a current valve that is not to be closed, to close all current valves which do not correspond to said current valve. By way of example, if a first current valve is permanently open, then the active short circuit can still be controlled by closing all second current valves. Closing the first current valves would have only a reduced effect or no effect at all in this case.

The switch-off device can be configured to deactivate a control signal for closing a current valve at the first interface. (==> task of 165) This makes it possible to avoid the closing of a current valve which is not involved in the active short circuit and the closing of which could cause a short circuit between the potentials.

The switch-off device can also be configured to deactivate a control signal for opening a current valve at the first interface. (==> task of 165) This makes it possible to ensure that an active short circuit to be driven comprises all mutually corresponding current valves, that is to say all first or all second current valves. The efficiency of the active short circuit can thus be increased.

The switch-off device or a part thereof can be implemented as hardwired logic. A high processing speed and a high resistance to interference can be achieved as a result. Moreover, the logic can be exhaustively validated as early as in a conception phase, with the result that erroneous switching later may be very unlikely.

The inverter can comprise three bridge circuits, wherein the inverter is preferably configured for connecting a three-phase electromechanical transducer. The electromechanical transducer can generally comprise an electric machine operated as a motor or as a generator. By way of example, the electromechanical transducer can comprise a rotary machine, in particular rotating field machine, which can be controlled by means of field-oriented control (FOC), for example. The electric machine can comprise an asynchronous machine (ASM) or a permanent-magnet synchronous machine (PSM).

In another embodiment, the inverter comprises only two bridge circuits; this arrangement is also known as an H-bridge. In this case, the electric machine can comprise a DC motor, in particular of the commutated type.

An actuator comprises an inverter described herein; an electric machine; and a control device configured for controlling a rotary behavior of the electric machine. The actuator can be used for example as an integrated actuating or traction drive, in particular on board a motor vehicle.

A method for controlling an electric machine which is operated by means of an inverter described herein at a voltage source with a first and a second potential comprises steps of detecting a switch-off signal; and of closing all first current valves or all second current valves independently of signals at the first interface. It is possible to ensure here that in a first case exclusively the first current valves are closed and the second current valves are not closed, or in a second case the second current valves are closed and the first current valves are not closed. This differentiation is also known as exclusive-OR (XOR).

The invention will now be described in more specific detail with reference to the accompanying figures, in which.

Figure 1:
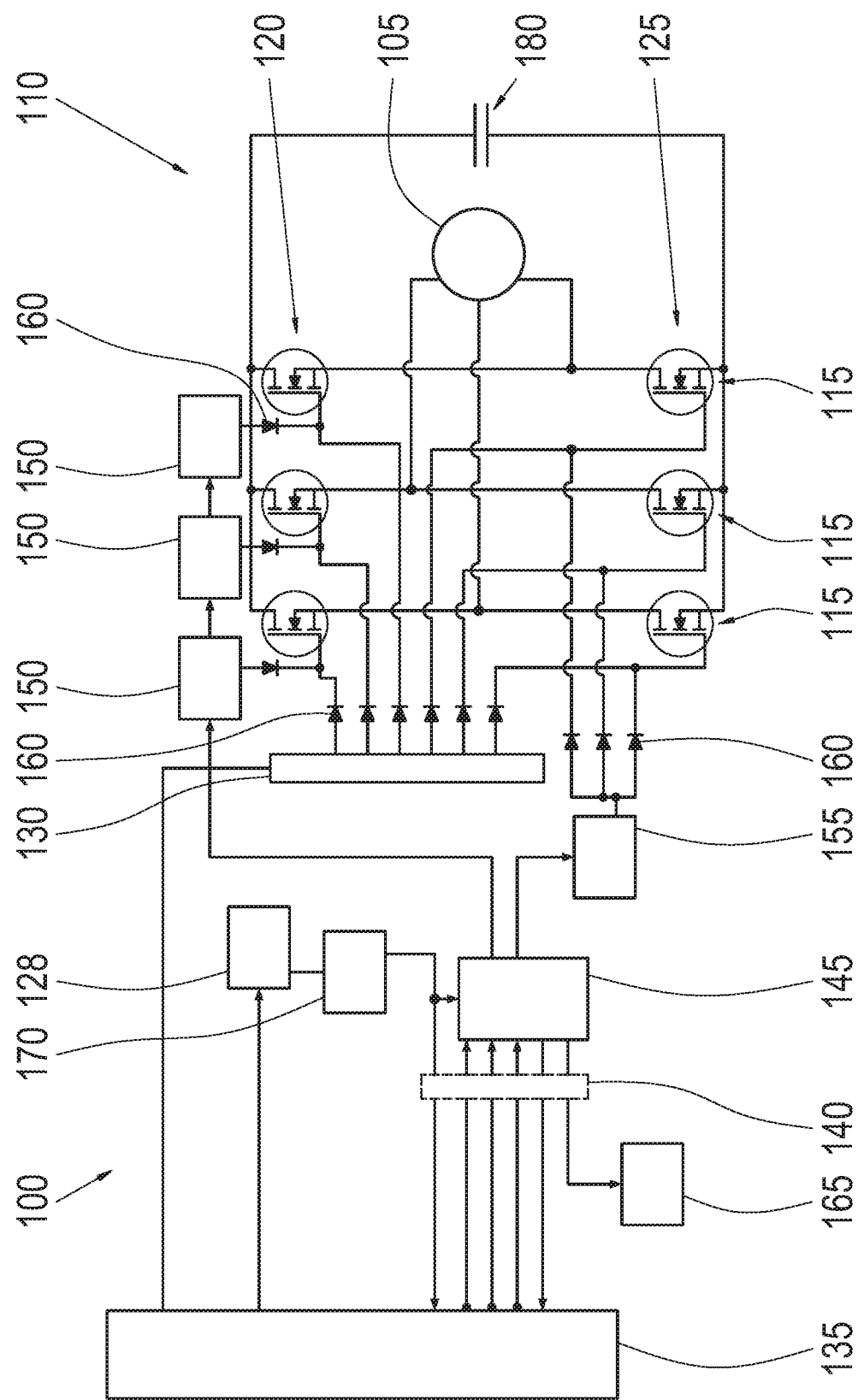
FIG. 1 illustrates a system comprising a controllable electric machine.

FIG. 1 shows a system 100 comprising a controllable electric machine 105 and an inverter 110. In the present embodiment, the electric machine 105 comprises three terminals and can be embodied in particular as a three-phase electromechanical actuator. The inverter 110 accordingly comprises three bridge circuits 115 each comprising a first current valve 120 and a second current valve 125. The bridge circuits 115 can be operated at a link circuit with a link circuit capacitor 180, which provides a voltage between a high potential and a low potential. The link circuit can comprise a battery 128, for example, the connection of which to the bridge circuits 115 is not illustrated in FIG. 1.

The current valves 120, 125 are preferably producible using semiconductor technology. A first current valve 120 here is connected to the high potential and can also be referred to as a high side switch, while a second current valve 125 here is connected to the low potential and can also be referred to as a low side switch. Control terminals of the current valves 120, 125 are individually routed to a first interface 130. A control device 135 for controlling the electric machine 105 can be connected (not illustrated) to the first interface 130. The control device 135 can carry out in particular field-oriented control (FOC) or field-oriented regulation (FOR) of the electric machine 105.

The inverter 110 furthermore comprises a second interface 140, which is connected to a switch-off device 145. In the present embodiment, the second interface 140 comprises a plurality of signals; in another embodiment, a single signal can also be sufficient. The switch-off device 145 is configured to detect a switch-off signal at the second interface 140 and thereupon to bring the electric machine 105 into a safe state. To that end, the switch-off device 145 can in particular either close the first current valves 120 in order to bring about a first active short circuit at the electric machine 105, in the case of which short circuit terminals of the electric machine 105 are connected to the high potential, or the switch-off device 145 can close the second current valves 125 in order to bring about a second active short circuit at the electric machine 105, in the case of which short circuit the terminals are connected to the low potential.

Mutually corresponding current valves 120, 125 can be driven by the switch-off device 145 in each case by means of individual first drivers 150, which can be connected to the switch-off device 145 in a manner connected to one another as a chain (Daisy Chain) as shown or in each case separately, or by means of a common driver 155. The switch-off device 145 or the drivers 150, 155 and the first interface 130 are decoupled from one another by means of diodes 160, for example, in order to avoid a short circuit at the level of the control signals. Other solutions may use logic gates, transistors, MOSFETs or resistors, for example.

A switch 165 is connected to the switch-off device 145 via the second interface 140 and serves for deactivating the first interface 130 in the event of a malfunction or for overriding the first interface 130 by shutting off the functionality from the first interface 130.

The switch-off device 145 can accept a plurality of switch-off signals. One switch-off signal can be provided by the control device 135 if the latter determines a fault state, for example. A second switch-off signal can originate from a voltage monitoring 170, wherein the second switch-off signal can be provided if a voltage of the link circuit at the link circuit capacitor 180, from which the bridge circuits 115 are fed, or if the voltage supply 128 falls below one predetermined value or exceeds another predetermined value. In the present embodiment, additional, optional control connections are illustrated, which are provided and correspondingly designated for exchanging signals or states with the control device 135, in particular.

Figure 2:
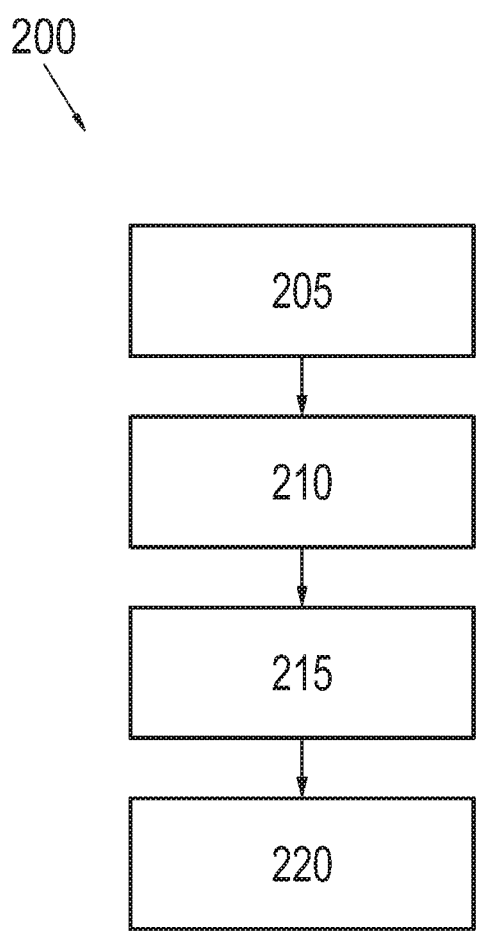
FIG. 2 illustrates a flow diagram of a method for controlling an electric machine.

FIG. 2 shows a flow diagram of a method 200 for controlling an electric machine 105 connected by means of an inverter 110 of the type from FIG. 1. The method 200 can be carried out wholly or in parts by means of the inverter 110, in particular the switch-off device 145 thereof. To that end, the switch-off device can comprise a programmable microcomputer or microcontroller and the method 200 can be present in the form of a computer program product having program code means. Features, options or advantages of the method 200 can be applied to the inverter 110 or the switch-off device 145, and vice versa.

In a first step 205, a fault state can be determined. The fault state can be determined for example by the control device 135, the voltage monitoring 170 or the switch-off device 145. In any case a switch-off signal can be determined which comprises a request to bring the electric machine 105 into a safe state.

In an optional step 210, a functionality of the current valves 120,125 can be determined. In particular, a check can be made to ascertain whether one of the current valves 120, 125 cannot open or cannot close. On the basis of a result of the determination, a step 215 can involve determining whether the safe state is intended to be controlled by closing the first current valves 120 or by closing the second current valves 125. If one of the current valves 120, 125 cannot be opened, then all corresponding current valves 120, 125 ought to be closed. If one of the current valves 120, 125 cannot be closed, then all non-corresponding current valves 120, 125 ought to be closed. If all current valves 120, 125 are in order, then a presetting can be used or a random choice of either the first or the second current valves 120, 125 can be made. If the switch-off signal determined in step 205 indicates which of the current valves 120, 125 ought to the closed in order to bring the machine 105 into the safe state, then the check, in step 210, can be omitted. In another embodiment, the result of the check can override the request received by way of the switch-off signal.

In a step 220, the safe state can be controlled by means of the previously determined first current valves 120 or the previously determined second current valves 125 being closed. In one embodiment, control signals provided via the first interface 130 are deactivated, overridden or switched off. Moreover, it is possible to provide a signal toward the outside, this signal indicating the driving toward the safe state. The signal optionally comprises an indication of which current valves 120, 125 are closed. The signal can be provided to the control device 135, in particular.

REFERENCE SIGNS

100 System
105 Electric machine
110 Inverter
115 Bridge circuit
120 First current valve (High Side Switch)
125 Second current valve (Low Side Switch)
128 Voltage supply (e.g. LDO)
130 First interface
135 Control device
140 Second interface
145 Switch-off device
150 First driver
155 Second driver
160 Diode
165 Switch
170 Voltage monitoring
180 Link circuit capacitor
200 Method
205 Determining a fault state
210 Determining functionality of the current valves
215 Determining active short circuit
220 Driving active short circuit

The invention claimed is:

1. An inverter for controlling an electric machine at a voltage source with a first potential and a second potential, wherein the inverter comprises:
a plurality of bridge circuits each comprising a first current valve, a second current valve and a terminal configured to connect to the electric machine;
a first interface for receiving individual control signals for the first current valve and the second current valve;
wherein each first current valve controls current between a high electrical potential and an assigned terminal, and each second current valve controls current between the assigned terminal and a low electrical potential;
a second interface for detecting a switch-off signal; and
a switch-off device configured to close either all first current valves or all second current valves depending on the switch-off signal and independently of signals at the first interface,
wherein the switch-off device is configured to:
determine that at least one of the first current valves cannot be closed; and
close the second current valves responsively; and
wherein the switch-off device is further configured to:
determine a current valve of the first current valves and the second current valves that cannot be opened; and
responsively close all current valves of either the first current valves or the second current valves that correspond to the current valve that cannot be opened.

2. The inverter of claim 1, wherein the switch-off device is further configured to deactivate a control signal for at least one of closing or opening at least one of the first current valve or the second current valve at the first interface.

3. The inverter of claim 1, further comprising three bridge circuits, wherein the inverter is configured to connect to a three-phase electromechanical transducer.

4. An actuator, comprising the inverter of claim 1, the electric machine, and a control device configured to control a rotary behavior of the electric machine.

5. An inverter for controlling an electric machine at a voltage source with a first potential and a second potential, wherein the inverter comprises:
a plurality of bridge circuits each comprising a first current valve, a second current valve and a terminal configured to connect to the electric machine;
a first interface for receiving individual control signals for the first current valve and the second current valve;
wherein each first current valve controls current between a high electrical potential and an assigned terminal, and each second current valve controls current between the assigned terminal and a low electrical potential;
a second interface for detecting a switch-off signal; and
a switch-off device configured to close either all first current valves or all second current valves depending on the switch-off signal and independently of signals at the first interface,
wherein the switch-off device is configured to:
determine that at least one of the second current valves cannot be closed; and close the first current valves responsively; and
wherein the switch-off device is further configured to:
   determine a current valve of the first current valves and the second current valves that cannot be opened; and
   responsively close all current valves of either the first current valves or the second current valves that correspond to the current valve that cannot be opened.

6. The inverter of claim 5, wherein the switch-off device is further configured to deactivate a control signal for closing at least one of the first current valve or the second current valve at the first interface.

7. The inverter of claim 5, wherein the switch-off device is further configured to deactivate a control signal for opening at least one of the first current valve or the second current valve at the first interface.

8. The inverter of claim 5, wherein the switch-off device is implemented as hardwired logic.

9. The inverter of claim 5, further comprising three bridge circuits, wherein the inverter is configured to connect to a three-phase electromechanical transducer.

10. An actuator, comprising the inverter of claim 5, the electric machine, and a control device configured to control a rotary behavior of the electric machine.

11. A method for controlling an electric machine that is operated by an inverter at a voltage source with a first electrical potential and a second electrical potential,
   wherein the inverter comprises:
      a plurality of bridge circuits each comprising a first current valve, a second current valve and a terminal configured to connect to the electric machine; and
      a first interface for receiving individual control signals for the first current valve and the second current valve;
      wherein each first current valve controls current between the first electrical potential and the assigned terminal, and each second current valve controls current between the assigned terminal and the second electrical potential;
   wherein the method comprises:
      detecting a switch-off signal;
      determining that at least one of the first current valves cannot be closed; and
      responsively closing all second current valves independently of signals at the first interface;
   wherein the method further comprises:
      determining a current valve of the first current valves and the second current valves that cannot be opened; and
      responsively closing all current valves of either the first current valves or the second current valves that correspond to the current valve that cannot be opened.

12. The method of claim 11, further comprising:
determining the current valve of the first current valves that cannot be opened; and
responsively closing all the first current valves.

13. The method of claim 11, further comprising:
determining the current valve of the second current valves that cannot be opened; and
responsively closing all the second current valves.

14. The method of claim 11, further comprising:
deactivating a control signal for closing at least one of the first current valve or the second current valve at the first interface.

15. The method of claim 11, further comprising:
deactivating a control signal for opening at least one of the first current valve or the second current valve at the first interface.

16. The method of claim 11, wherein the first electrical first electrical potential is a high electrical potential and wherein the second electrical potential is a low electrical potential.

* * * * *